(12) United States Patent
Starodubtsev et al.

(10) Patent No.: US 8,120,333 B2
(45) Date of Patent: Feb. 21, 2012

(54) METHOD OF CHARGING DOUBLE ELECTRIC LAYER ELECTROCHEMICAL CAPACITORS

(75) Inventors: Nikolai Fedorovich Starodubtsev, Troitsk (RU); Vladislav Alekseevich Karpov, Moscow (RU); Viktor Alexandrovich Dronov, Troitsk (RU); Samvel Avakovich Kazaryan, Troitsk (RU); Vladimir I. Kogan, Reynoldsburg, OH (US); John R. Miller, Shaker Heights, OH (US); Sergey Nikolaevich Razumov, Moscow (RU); Alexander Ivanovich Smelkov, Troitsk (RU); Sergey Vitalievich Litvinenko, Zelenograd (RU)

(73) Assignee: Universal Supercapacitors LLC, Columbus, OH (US)

( * ) Notice: Subject to any disclaimer, the term of this patent is extended or adjusted under 35 U.S.C. 154(b) by 0 days.

(21) Appl. No.: 11/945,827

(22) Filed: Nov. 27, 2007

(65) Prior Publication Data
US 2008/0185998 A1    Aug. 7, 2008

Related U.S. Application Data

(60) Provisional application No. 60/867,271, filed on Nov. 27, 2006.

(51) Int. Cl.
*H02J 7/00* (2006.01)
(52) U.S. Cl. ..................................... 320/167
(58) Field of Classification Search .............. 320/166, 320/167, 132, 139, 157, 162; 324/426, 427
See application file for complete search history.

(56) References Cited

U.S. PATENT DOCUMENTS

| | | |
|---|---|---|
| 3,597,673 A | 8/1971 | Burkett et al. |
| 4,439,719 A | 3/1984 | Lambert et al. |
| 5,172,044 A | 12/1992 | Sasaki et al. |
| 5,180,961 A | 1/1993 | Tsujino |
| 5,477,125 A | 12/1995 | Ettel et al. |
| 5,500,584 A | 3/1996 | Shimomoto |
| 5,589,757 A | 12/1996 | Klang |
| 5,600,230 A | 2/1997 | Dunstan |
| 5,612,607 A | 3/1997 | Nicolai |
| 5,633,576 A | 5/1997 | Rose et al. |

(Continued)

FOREIGN PATENT DOCUMENTS
WO       03081618       10/2003

OTHER PUBLICATIONS

Dunn, Darryl., et al., Prediction of Specific Energies and Specific Powers of Double-Layer Capacitors Using a Simplified Model, J. Electrochem. Soc., vol. 147, Issue 3, pp. 820-830 (Mar. 2000).

(Continued)

*Primary Examiner* — Ramy Ramadan
(74) *Attorney, Agent, or Firm* — Standley Law Group LLP

(57) ABSTRACT

The present invention is directed to methods for the automatic charging of an electrochemical electrical energy storage device. Charging may be performed until a pre-assigned voltage increment value measured across the terminals of the storage device is reached. Recurrent periods of charging and rest may be employed, with measurements of voltage taken and voltage increment determined after the passage of an assigned quantity of electrical energy. Automatic completion of the charging process is provided for, irrespective of the design features and number of energy storage devices (e.g., capacitors) in a module, the initial state of charge and/or temperature of the storage device, or the value and/or time instability of the charging current.

23 Claims, 13 Drawing Sheets

U.S. PATENT DOCUMENTS

| | | | |
|---|---|---|---|
| 5,640,080 | A | 6/1997 | Tamai et al. |
| 5,694,023 | A * | 12/1997 | Podrazhansky et al. ...... 320/129 |
| 5,780,994 | A | 7/1998 | Sisemore |
| 5,900,718 | A | 5/1999 | Tsenter |
| 6,011,379 | A | 1/2000 | Singh et al. |
| 6,060,865 | A | 5/2000 | Chen et al. |
| 6,094,033 | A | 7/2000 | Ding et al. |
| 6,222,723 | B1 | 4/2001 | Razoumov et al. |
| 6,225,781 | B1 | 5/2001 | Okamura et al. |
| 6,232,750 | B1 | 5/2001 | Podrazhansky et al. |
| 6,313,605 | B1 | 11/2001 | Tsenter |
| 6,366,056 | B1 | 4/2002 | Podrazhansky et al. |
| 6,388,427 | B1 | 5/2002 | Levine |
| 6,424,158 | B2 | 7/2002 | Klange |
| 6,479,969 | B1 | 11/2002 | Fazakas |
| 6,518,734 | B1 | 2/2003 | Nourai et al. |
| 6,842,331 | B1 | 1/2005 | Kazaryan et al. |
| 6,928,381 | B2 | 8/2005 | Becker-Irvin et al. |
| 6,947,855 | B2 | 9/2005 | Verbrugge et al. |
| 6,972,921 | B1 * | 12/2005 | Rana et al. ...................... 360/75 |
| 7,148,697 | B2 | 12/2006 | Doljack |

OTHER PUBLICATIONS

Kazaryan, S.A., et al., Mathematical Model of Heterogeneous Electrochemical Capacitors and Calculation of their Parameters, J. Electrochem. Soc., vol. 153, Issue 9, pp. A1655-A1671 (2006).

* cited by examiner

S1

S2

S3

S4

S5

S6

S7

S8

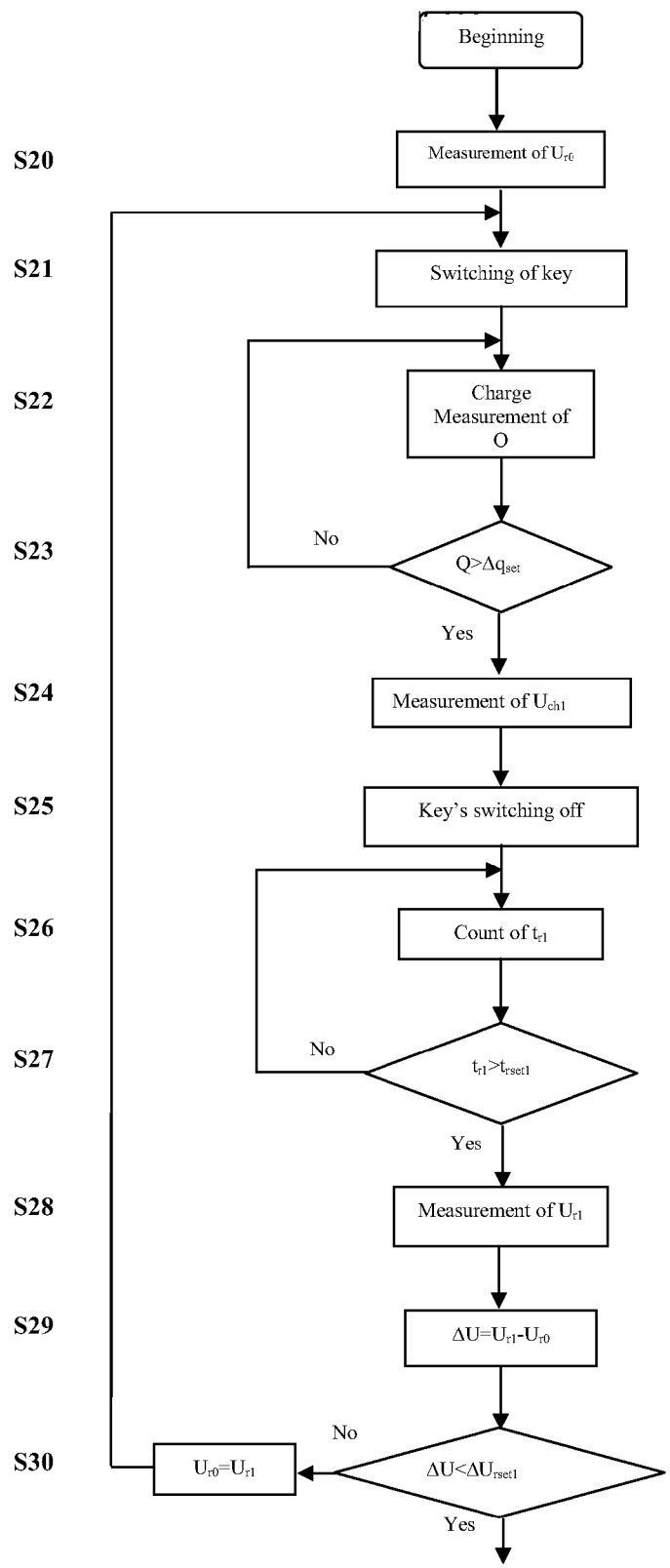
Fig. 10 (first part)

METHOD OF CHARGING DOUBLE ELECTRIC LAYER ELECTROCHEMICAL CAPACITORS

BACKGROUND OF THE INVENTIVE FIELD

The present invention relates to the charging of electrochemical capacitors designed for the storage of electrical energy. More particularly, the present invention is directed to providing an effective method for charging electrochemical capacitors when the charge power changes over time, and to ensuring the timely completion of the charging process once an optimal state of charge is reached.

Heterogeneous electrochemical supercapacitor (HES) energy storage devices have been increasingly used for electrical energy storage (see, e.g., U.S. Pat. No. 6,518,734 to A. Nourai, et al., entitled "System And Method Of Forming Capacitor-Based Electrical Energy Storage Modules"). Traditionally, electrical energy storage by rechargeable power sources has been dominated by storage batteries. However, various features of HES devices make their use for electrical energy storage superior to batteries. For example, while HES devices may be inferior to batteries in terms of the value of their specific weight and volume of stored energy, HES devices are significantly better than batteries in terms of life cycle, range of allowable values of charge current, and rapid charging capability. As such, HES devices are well-suited to use as, without limitation, energy-intensive power sources for industry, telecommunications systems, public utility companies, electric vehicles and hybrid vehicles; as electrical energy storage devices for electric power generated in stationary or portable (transported or field) wind and hydroelectric installations; and as portable power sources, charged from muscle driven generators, etc.

In order to effectively use any sealed electrical energy storage device, it is necessary to provide for control of its charge process. The list of the parameters monitored and controlled during the charge process depends considerably on the parameters of the electrochemical system, its particular design, and the field of use of the energy storage device.

There are a great many known methods for controlling the charging process of batteries. For example, various charging techniques exist in which the state of charge is determined and charge control is performed by controlling changes of the main parameters of the battery over time via controlled changes of the charge mode. In one such process, measurements of current and voltage during the charge-discharge cycle are taken and the measured parameters are compared with pre-assigned values, which may be determined experimentally or by mathematical modeling. Controlled changing of the charge mode is then performed based on said comparison. In another such process, the first or second time derivative of voltage is measured, temperature changes during the course of the charge process are controlled, and changes in the current or voltage in different steps of the charge process are controlled. In yet another such process, the charge voltage or current is controlled by changing the parameters of the outgoing charge current pulses or pulse trains.

There are, however, fundamental differences between batteries and electrochemical capacitor energy storage devices that prevent or teach against the use of identical charging process control schemes. Primarily, in electrochemical capacitors, unlike batteries, it is the value of the voltage to which the capacitor is charged that determines the value of the electrical energy that can be stored thereby. Thus, a desired value of stored electrical energy is obtained by charging such a capacitor to a specified charge voltage value, which charge voltage value is chosen from the operating voltage range of the capacitor. When choosing this specified charge voltage value, it is necessary to take into account the current temperature condition of the capacitor, which typically changes rapidly during a high-current charging process.

Therefore, other known capacitor charging processes have been developed. For example, it is known that capacitors may be charged by constant current, constant voltage, or constant power techniques. Charging under constant current to the specified voltage is likely the most commonly used charging method.

As mentioned above, the value of the specified voltage depends on the operating temperature and the value of the charge current, and is set empirically for this design of a particular capacitor. For example, in patent application PCT/RU03/00109, WO03/081618 to 1. Varakin et al., entitled "Method Of Charge And Discharge Of Capacitor With Double Electric Layer", the voltage at which the leakage current and power intensity of a capacitor are optimal at a given measured temperature of the electrolyte is assumed to be the maximum operating voltage of the charge.

When the specified value of voltage is reached, the charging of a capacitor may continue at constant voltage. As the state of charge increases, the value of the charge current decreases. Charging at constant voltage may be deemed complete, for example, upon expiration of a specified time or when the charge current decreases to a specified value.

One constant current charging method of interest is described in U.S. Pat. No. 5,640,080 (the '080 patent) to Mikitaka Tamai, entitled "Secondary Battery Charge". The charging process described therein is performed by employing alternating periods of charging and rest. During each charging interval, the quantity of electricity $\Delta Q$, which passes through the battery, is limited to a value that will not bring about any deterioration of battery parameters due to overcharging. This quantity of electricity is defined as a portion of the battery's full capacity (for example, not more than 5% of the rated capacity). Charging is deemed complete when the voltage measured across the terminals of the battery during a rest period becomes equal to or higher than a predetermined voltage value.

The batteries of the '080 patent are charged by alternating periods of charging (having their initial duration of $T_{cha}$) and rest (having constant duration $T_{re}$). Thereafter, the measured voltage $V_{ch}$ is compared during charging periods with the predetermined voltage value $V_{cha}$. When the measured voltage $V_{ch}$ across the terminals is equal to or exceeds the predetermined voltage value $V_{cha}$, the battery is deemed to be fully charged. Each time the measured voltage $V_{ch}$ reaches the predetermined value $V_{cha}$, the quantity of electricity provided in each subsequent charge period (which is followed by a period of rest) decreases. The charging process is complete when the quantity of electricity provided for charging reaches a zero value.

In a variation of the charging process, the '080 patent teaches that each time the measured voltage $V_{ch}$ reaches the predetermined value $V_{cha}$, the pre-assigned quantity of charging electricity may remain unchanged while the duration of the subsequent rest period is increased. In other words, the change in temperature of the battery is taken into account. The value $V_{cha}$ may be reduced, subject to the temperature of the battery.

When a HES is charged, the voltage across its terminals $U_{ch}$ depends on the parameters of the HES and the conditions of the charge process:

$$U_{ch} = U_0 + IR + \Delta U \tag{1}$$

wherein $U_0$ corresponds to the stationary voltage which is set in the charged capacitor after the completion of the charge and depolarization processes, IR corresponds to voltage surge when the charge current is turned on and off, and $\Delta U$ is explained in more detail below.

The value of the stationary voltage $U_0$ is determined by the charge amount and capacitance of the capacitor C. Further, it is known that the capacitance of the capacitor is, in turn, a function of the potential of the polarizable electrode ($\phi$), the state of its charge, and its temperature T (i.e., $U_0=Q/C(Q,\phi,T)$).

The voltage surge IR is a manifestation of the voltage drop at the Ohmic resistance. It is a function of the change in charge current amplitude over time I(t), and the internal resistance depends on the state of charge, potential of the polarizable electrode, and temperature of the capacitor (i.e., $R(Q,\phi,T)$).

$\Delta U$ makes a considerable contribution to the change of voltage across the terminals of the HES during the charging process. One of the components in the value $\Delta U$ is determined by the polarization processes of the HES'. It depends on the values Q, $\phi$, T, t, and also on the employed type of the electrochemical system and the particular design features of the HES. These design features may include, for example, conductivity, spatial structure and thickness of the polarizable and non-polarizable electrodes, conductivity of the electrolyte, and thickness of the separator.

The second significant component in the value $\Delta U$ is determined by the processes taking place during the gas cycle of the HES, which unfolds in systems that employ aqueous non-organic acid solutions as electrolytes. This second component is related to the processes of oxygen evolution in the positive electrode and of hydrogen in the negative electrode, when the values of the electrodes' potentials exceed equilibrium values. When a HES nears a maximum state of charge, the quantity of electricity contributing to charging decreases, and the quantity contributing to electrolyte decomposition increases. The voltage across the terminals of the HES then reaches the maximum value.

These processes also result in the reduction of evolved oxygen in the negative electrode, and the formation of water, which brings about depolarization of the potential of the negative electrode and, accordingly, a reduction in voltage of the HES. Exothermic reactions associated with the reduction of the oxygen are accompanied by an increase in HES temperature. As a result, the overpotential of oxygen and hydrogen evolution of the positive and negative electrodes, respectively, is reduced, and the voltage in the across the terminals of the HES begins to decrease. When charging current is further passed, an increase in the amount of oxygen evolved in the positive electrode and an increase of gassing inside the case of the HES also occurs.

Therefore, in the process of charging HES devices, the maximum voltage value is typically a changing parameter. Maximum voltage depends on specific electrochemical and design characteristics of the HES, as well as its state of charge, current temperature condition, and rate of charge. The value of the quantity of charge electricity, at which the maximum voltage is reached in these particular conditions, corresponds to the optimal state of charge of the HES and the level of its Coulomb and energy losses.

From the foregoing description, it would be apparent to one skilled in the art that the depolarization and electrochemical processes taking place during the gas cycle of the HES bring about a decrease of its Coulomb capacity, a decrease in the energy efficiency of its charge-discharge cycle, and a growth of its internal resistance. Furthermore, when uncontrolled charging is performed, some reduction of the life cycle of a HES is also possible.

In practice, it is necessary to ensure that the charging algorithm applied to a HES device makes it possible to complete an effective charge, even when the value of the charge power is changing in a wide range, and irrespective of the initial state of charge and thermal condition of the HES. For example, a considerable change in the thermal condition of a HES may occur when the charge rate of the HES is high. Inasmuch as a HES is very capable of charging by currents of different values, the duration of a charging process may vary from several minutes to several hours. The ability to control changes in the charging rate makes it possible to choose optimal power and price parameters of the charger, on the one hand, while imposing certain requirements on the versatility of the charge method, on the other hand.

Stringent requirements to the charging process algorithm are set for a floating charge (i.e., charge at constant voltage). For example, in order to compensate for capacity and energy losses that may occur when an electrical energy storage device is used as a back-up power source, or that may occur during long-term storage of such a device in its maximum charged condition, it is necessary to perform an additional charge. When the electrical energy storage device is a battery, this additional charging is performed by various methods. For example, additional charging may be performed at constant voltage, by currents of small value (that are close to the value of the leakage current), or by recurrent switching of the floating charge. These methods require an accurate setting of the floating voltage value, a limiting of the maximum charge current value, and the maintaining of stable temperature conditions. When the stationary thermal mode is violated, there is high risk of "thermal acceleration" during which the processes of the gas cycle may be accelerated, the temperature may go up, and the charge current may increase in a spontaneous and critically fast manner.

Currently, the modeling of the kinetics of the charge and discharge processes, subject to some of the aforementioned parameters, makes it possible (with a high rate of probability) to forecast energy characteristics of capacitors having different designs (see, e.g., D. Dunn, J. Newman, "Prediction Of Specific Energies And Specific Powers Of Double-Layer Capacitors Using A Simplified Model," J. Electrochem. Soc., 147, 820 (2000); S. Kazaryan, S. Razumov, S. Litvinenko, G. Kharisov, and V. Kogan, "Mathematical Model Of Heterogeneous Electrochemical Capacitors And Calculation Of Their Parameters," J. Electrochem. Soc., (2006), in press). At the same time, however, the practical task of controlling the charging process of HES devices remains unresolved.

SUMMARY OF THE GENERAL INVENTIVE CONCEPT

The present invention is directed to the controlled and optimal charging of electrochemical capacitors. A charging process of the present invention should provide, for example: an optimal or pre-assigned value of stored energy; a timely stoppage of the charging process so as to rule out any overcharge; a complete charge, irrespective of the initial state of charge; an optimal charge over the entire range of capacitor operating temperatures; prevention of excessive overheating and possible gassing via the safety valve; and compensation for losses of energy during operation of a capacitor as a back-up power source or due to self-discharge, so as to maintain the capacitor device in a state of maximum charge for a long period of time.

The charging methods of the present invention are based on specific features of the design and principles of operation of HES devices (see, e.g., U.S. Pat. No. 6,222,723 to R. S. Razumov, et al., entitled "Asymmetric Electrochemical Capacitor And Method Of Making.") Two types of electrodes are used in such a HES: a polarizable electrode and a non-polarizable electrode. Preferably, battery-type (positive) electrodes whose electrochemical properties are determined by Faraday processes are used as non-polarizable electrodes. The polarizable electrode (the negative electrode) employs a double electric layer charge storage process. Different composites based on activated carbon materials typically serve as the active material of such polarizable (negative) electrodes.

In order to provide for the effective operation of such HES devices, the value of the electric (Coulomb) capacity of the non-polarizable electrode is preferably selected to be several times higher than the value of the electric capacity of the polarizable electrode. Additionally, the maximum discharge energy of the HES in its operating voltage window corresponds to the full discharge of the polarizable electrode and is determined by its stored energy. Inasmuch as the capacitance of the non-polarizable electrode is much higher, the non-polarizable electrode is discharged to a lesser degree than the polarizable electrode during the cyclic operation of the HES. As such, when a HES is fully discharged, its non-polarizable electrode is discharged to a lesser degree than would be the positive and negative electrodes of a battery during full discharge of the battery. Consequently, the life cycle of a HES may be significantly greater than that of a battery because, while the capacity and energy parameters of a HES device are determined by the parameters of the polarizable electrode, its life cycle characteristics depend primarily on the parameters of the non-polarizable electrode.

In one exemplary charging method of the present invention, charging of a HES occurs at constant current, and there is no need to preliminarily assign a particular charge voltage value. According to this embodiment, control of the charging process may be accomplished as follows: (1) the value of the positive increment of the charge voltage is set and, when this value is reached, the process is interrupted; (2) the voltage increment is determined, following the passage of the specified portion of the electricity quantity; and (3) when the voltage increment decreases to the specified value, the charge process is discontinued.

The specified positive value of the voltage increment determines the state of charge of the HES in relation to its optimal charge level. The optimal state of charge at the existing rate of charge and temperature condition of the HES corresponds to the zero increment of the voltage. If the charge continues until the negative increment of the voltage is reached, there is a fast growth of temperature, decrease of the Coulomb capacity and energy efficiency of the charge-discharge cycle, and there is risk of gas pressure increase inside the case of the capacitor.

In this embodiment, the predetermined value of the electricity quantity, after whose passage the charge voltage is measured and the voltage increment is determined, sets the time discreteness of measurements. The predetermined value of the electricity quantity will generally depend on individual characteristics of the HES and its design, as well as parameters of the measurement and charging control system used.

In this embodiment, timely interruption of the charging process results in the desired level of stored electrical energy in the HES. As such, there is no need for an accurate determination of the maximum voltage value at the end of the charging process or for continuous measurement of the temperature of each cell of the HES.

In another exemplary embodiment of the present invention, charging of a HES occurs under conditions of instability in the constant charge current. Under real life conditions, such instability may be provided for in the initial parameters of the power source, may be induced by magnetic pickups to the constant current source or by significant variations of ambient temperature, or may result from changes in the charging power according to accidental law. In such a case, the voltage across the terminals of the HES during the charging process may reach several local maximum values, which will not correspond to the optimal state of charge. The voltage increment may also change in a wide range, changing its sign in the vicinity of these local maximums.

By performing charging using recurrent periods of charge and rest, this embodiment of the present invention is tolerant of phenomena such as uncontrolled charge current pulses, a recurrent change in the amplitude of a constant charge current, and random changes in charging power. According to this embodiment, when the circuit is broken following the interruption of the charge current, the voltage across the terminals of the HES drops gradually due to depolarization of the electrodes and self-discharge of the capacitors. In the initial stage, the voltage drop is determined by depolarization of the electrodes. Subsequently, the self-discharge process becomes the main contributor to the voltage reduction. Thus, the processes of depolarization and self-discharge are accompanied by a decrease in the voltage and energy consumption of the HES. Charging of the HES according to this embodiment is then performed until the increment of voltage, which is measured at the end of each period of rest, reaches the predetermined value.

Recurrent charges are subsequently performed upon the passage of the specified portion of electricity quantity $\Delta q$. Thereafter, the charge current is interrupted for a period of rest. The duration of each rest period $t_r$ should be sufficient to measure the voltage, which should have a similar value for all the charge interruptions and is specifically selected subject to the design of the HES on the basis of time characteristics of the processes of depolarization of the HES' electrodes. The voltage value $U_r$ measured at the end of each rest period is compared with the voltage values measured in the preceding rest period, and voltage increment $\Delta U_r$ is determined. Charging of the HES is discontinued as soon as the voltage increment decreases to the specified value.

Charging techniques according to this embodiment of the present invention allow for the use of charging power which is randomly changing over time. This makes it possible to use inexpensive power sources in which no special technical means are used to stabilize the charge current.

A charging technique according to another embodiment of the present invention are directed to compensating for energy losses and increasing the stored electric energy in a HES. According to this technique, charging is periodically interrupted to produce periods of charging and rest. The periods of charging last as long as required to pass the specified portion of the electricity quantity $\Delta q$. The duration of all the rest periods $t_{r1}$ depends on the specific design of the HES and is determined by the time characteristics of the electrode depolarization processes. The voltage value $U_{r1}$ measured at the end of the rest periods is compared with the voltage values measured in the preceding rest period and subsequently the voltage increment $\Delta U_{r1}$, is determined.

As soon as the voltage increment decreases to the specified value $\Delta U_{r,set1}$, charging is performed with the limitation of the upper charge voltage $U_{ch\ max}$, which is reached at the end of the last charge period. Thereafter, short-time disconnections are effected as soon as the voltage at the end of the charge period reaches $U_{ch\ max}$. The voltage $U_{r2}$ is measured during the rest periods, and is compared with rest period voltage values measured in the preceding rest period. Thereafter, the voltage increment $\Delta U_{r2}$ is determined. Charging is deemed complete when the voltage increment decreases to the specified value $\Delta U_{r,set2}$, or when the duration of the charging periods decreases by some specified factor.

According to the charging technique(s) of this embodiment of the present invention, there is no need to assign a predetermined upper limit on the charge voltage, and no need to control the temperature of the HES. Furthermore, the losses attributable to the depolarization of the electrodes are compensated for, and optimal charging of the HES is automatically completed.

A charging technique of this embodiment of the present invention may also be used for recurrent compensation of the energy losses caused by self-discharging of a HES during long-term charged storage thereof. To this end, following the completed charging of the HES, control of the voltage across the terminals thereof is continued. In this manner, as soon as the measured voltage reaches the specified value, a repeated charge of the HES may be performed.

Therefore, it can be understood from the foregoing description that there are several variations for charging a HES according to the present invention. In summary, and according to a first embodiment, a HES may be connected to a constant current source for charging, during which time control is performed with respect to the passing, via the HES, of portions of the specified electricity, the voltages are measured, the measured voltages are compared with their predetermined (pre-assigned) values, and charging is completed. In this variation, portions of electricity quantity are determined on the basis of the capacitance values of the HES and the threshold sensitivity of the recording system. After passing of the specified portion of electricity, the voltage across the terminals of the energy storage device is measured and the voltage increment is determined. The charging process is deemed complete when the voltage increment reaches (goes down to) the specified value. Such a charging process may be employed irrespective of the initial values of the state of charge and operating temperature of the HES.

In an alternate charging scheme of the present invention, a HES may be charged using a constant current source as described above. In this embodiment, however, charging is also recurrently halted so as to produce a period of rest after the passing of a specified portion of electricity. All the periods of rest are of a set constant duration. The voltage at the end of each charging period and each rest period is measured, and the voltage measured at the end of a given rest period is compared with the voltage measured at the end of the preceding rest period to thereby determine the voltage increment. The charging process is deemed to be complete when the voltage increment during the rest periods reaches the specified value. This charging method may be used irrespective of the initial values of the state of charge and operating temperature of the HES. The duration of the rest periods may be set as equal to the time during which the contribution of the fast processes of depolarization to the voltage reduction decreases by some specified factor, or the duration of the rest periods may be set as equal to the time required to reduce the voltage during the rest periods by some specified factor. Other rest period durations may also, of course, be set.

In yet another charging scheme of the present invention, charging of a HES may be accomplished using a current source that is periodically turned off or disconnected from the HES as described above to provide periods of rest, but whose current value may also change randomly over time. The current value may be allowed to change within some range allowable for the HES being charged, in which case, the charging process is deemed complete when the voltage increment in the rest periods reaches some specified value. By this method, it is also possible that as soon as the voltage increment in the rest periods reaches the specified value, the charge is continued with a limitation on the voltage in the charge period and the voltage value set as equal to the value of the voltage at the end of the preceding charge period. In such a case, the charging process is deemed compete when the quantity of electricity portions in the charge periods or the duration of the charge periods decreases by some specified factor, or when the voltage increment reaches a specified value.

Especially with respect to this latter method, and wherein the HES is operating in the mode of a back-up power source, recurrent repeated charging can be performed at specified time intervals or after the specified value of the maximum voltage is achieved in order to compensate for energy losses resulting from the self-discharge of the HES.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE
EXEMPLARY EMBODIMENT(S)

A detailed description of several specific but exemplary embodiments of the present invention is provided below.

EXAMPLE 1

A capacitor module consisting of seven serially connected HES' of a $P_bO_2|H_2SO_4|C$ system was charged. The parameters of a single HES at room temperature during the charge by a 50 A constant current in the voltage window of 2.4-0.8 V was observed to be:

| | |
|---|---|
| capacitance | 180 kF |
| Coulomb capacity | 62 Ah |
| delivered energy | 110 Wh |
| impedance (at 50 Hz frequency) | 1.2 mOhm |
| self-discharge current | 50 mA |

Figure 1:
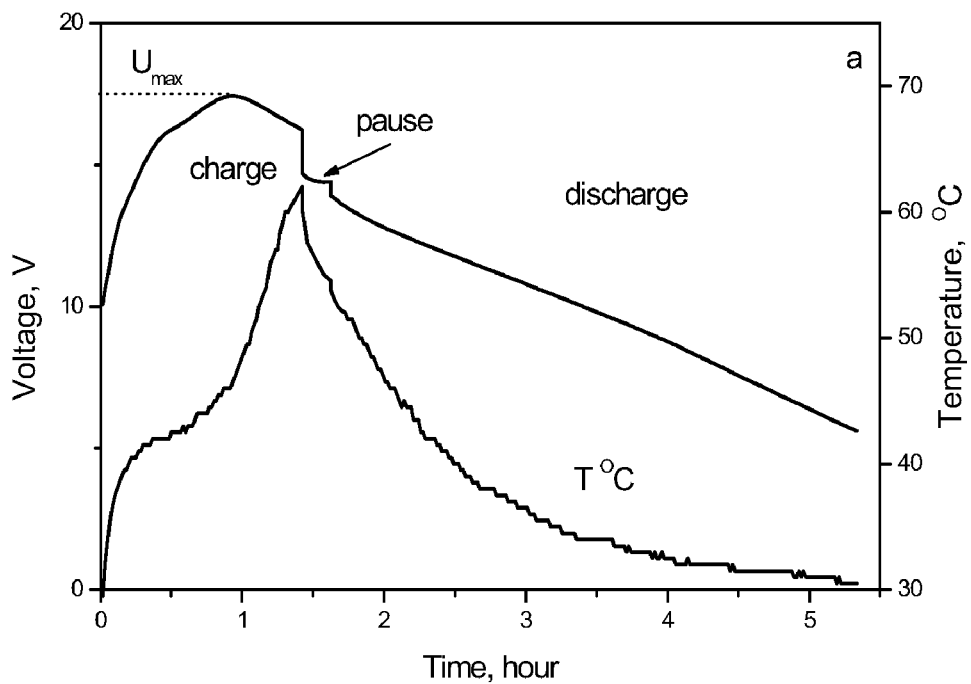
FIG. 1 graphically represents the change in voltage across the terminals and the change in temperature of a HES-based capacitor module in the process of charge and discharge by constant current.
Figure 1:
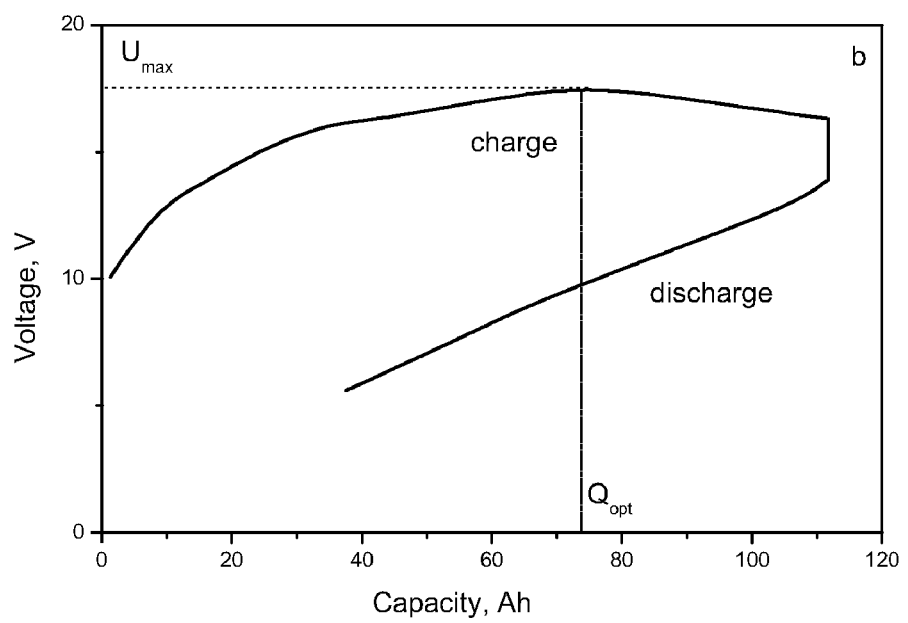

FIG. 1 shows the change in voltage and temperature of this capacitor module in the process of charge and discharge by the 50 A constant current in room temperature ambient air. As shown, the state of charge increases until the charge voltage reaches the maximum value $U_{max}=16.8$ V, whereafter it starts decreasing as charging is continued.

Figure 2:
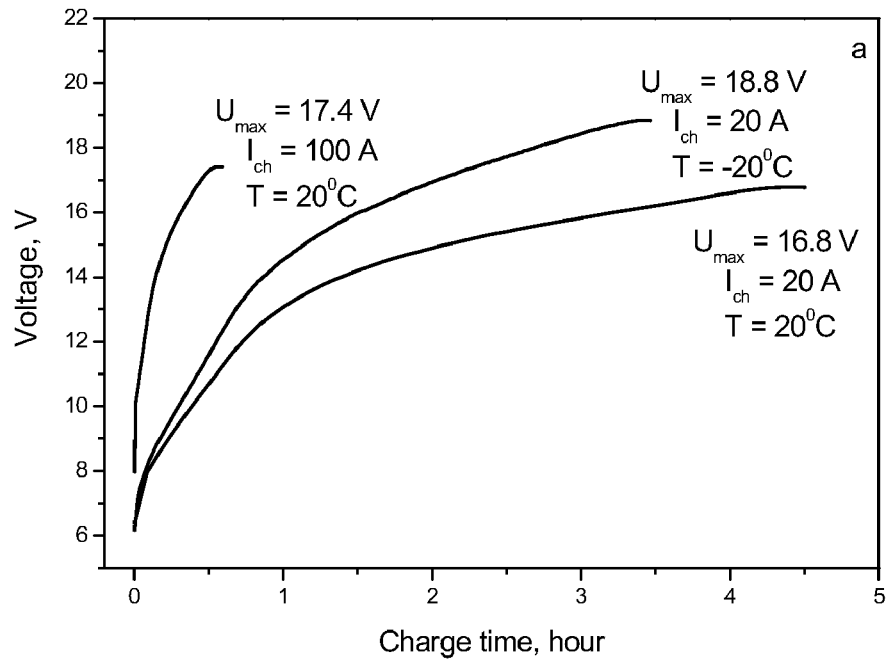
FIG. 2 graphically represents the change in voltage during charging of a HES-based capacitor module by different currents and any resulting changes in module temperature.
Figure 2:
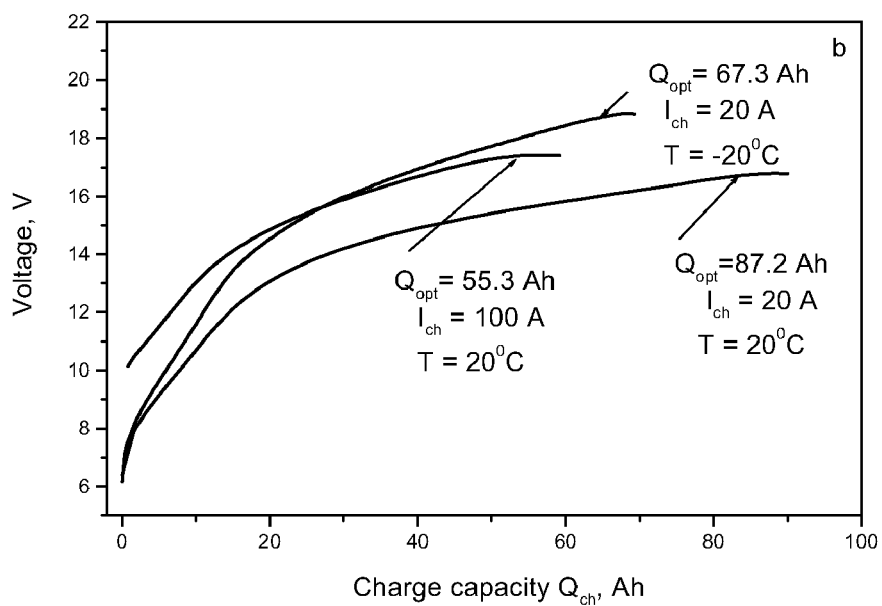

As shown in FIG. 2, when the capacitor module is charged by constant currents of different value and at different ambient air temperatures, the voltage of the capacitor module changes in a similar manner. This characteristic of the voltage behavior during the charging process is related to the passing of the "gas cycle" in HES devices. The achieved maximum value $U_{max}$ under these temperature conditions and some constant rate of charge corresponds to the maximum quantity of charge $Q_{opt}$.

Figure 3:
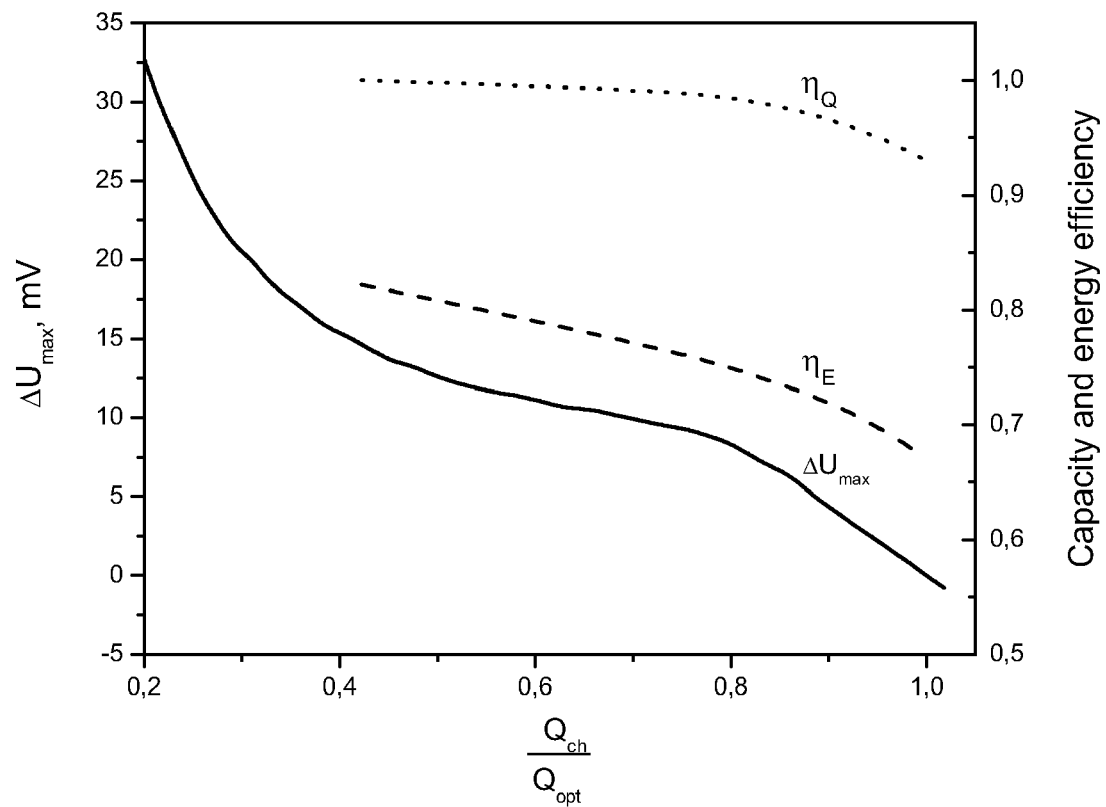
FIG. 3 graphically represents the change of voltage increment across the terminals of a HES-based capacitor module during charging by portions of electricity quantity subject to the normalized state of charge.

FIG. 3 graphically shows the dependence of the voltage increment $\Delta U_{max}$ on the charge capacity rated to the value of the optimal capacity of the module $Q_{opt}$. Experiments have shown that this dependence exists for all the allowable values of the charge current and the module's operating temperature. FIG. 3 also illustrates the change of Coulomb capacity $\eta_Q$ and energy efficiency $\eta_E$ in different modes of the charge and discharge cycles. With the use of these dependences, it is possible to charge the HES to a given state of charge in relation to the optimal value, as well as to set the desired level of capacity and energy losses thereof.

Figure 4:
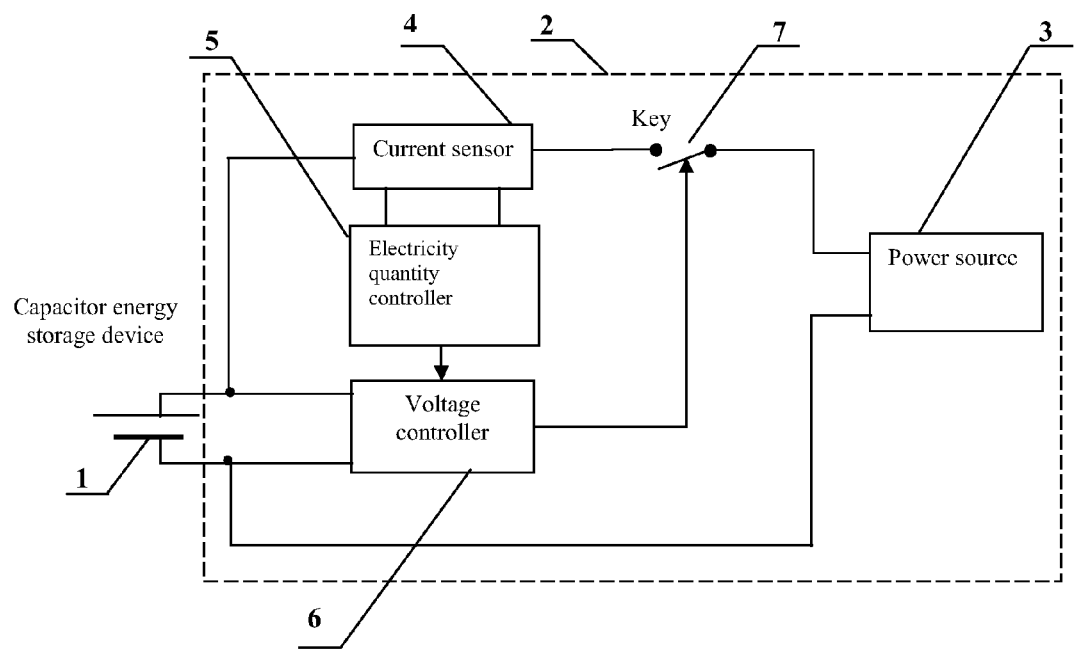
FIG. 4 is a block-diagram of one exemplary embodiment of a charger of the present invention.

FIG. 4 diagrammatically illustrates one exemplary embodiment of a charging device 2 of the present invention that can be used to charge a HES. A HES module 1 is connected to the charging device 2. As shown, the charging device 2 includes a power source 3, a current sensor 4, a controller of the electricity quantity 5, a voltage controller 6, and a key 7.

Figure 5:
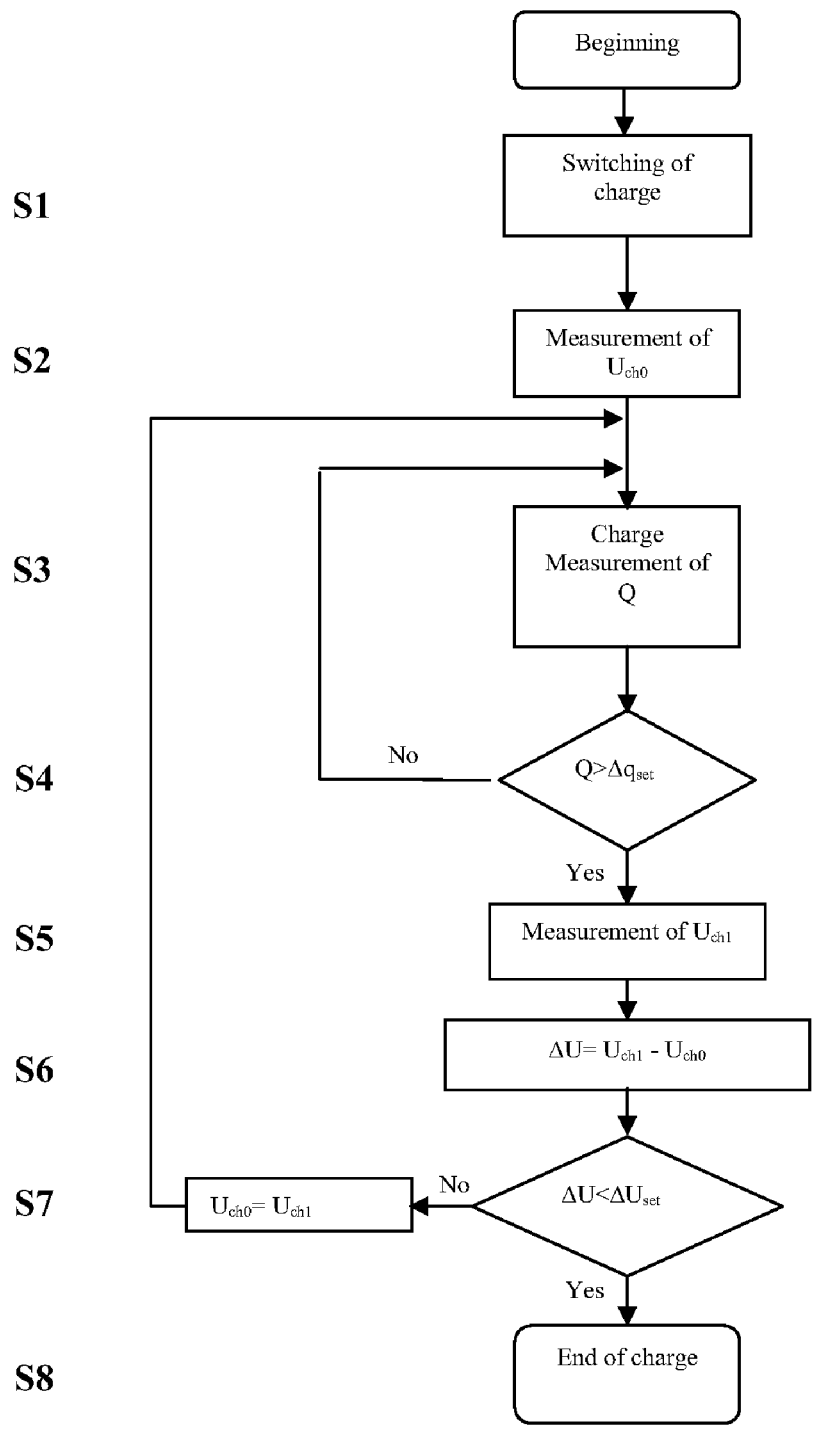
FIG. 5 diagrammatically represents the operating sequence of the charger of FIG. 4 during charging.

Charging by this device 2 may be performed in the sequence shown in FIG. 5. Referring to FIG. 5, it can be observed that at the time of switching (S1) of the charging device 2, a signal is sent to the voltage controller 6 in order to measure the initial voltage $U^{Ch0}$ (S2). The voltage controller 6 measures the voltage across the terminals of the energy storage device and stores it in memory. Upon completion of these operations, the key 7 of the charge circuit is switched, and the count of the electricity quantity Q begins (S3). If the electricity quantity does not exceed the specified portion of the electricity quantity $\Delta q_{set}$, charging continues (S4). When $\Delta q_{set}$ is reached, the electricity quantity controller 5 provides a signal to the voltage controller 6 and resets the value of the electricity quantity to zero. The voltage controller 6 measures voltage $U_{ch1}$ (S5) across the terminals of the HES module 1 and stores it in the memory. The measured voltage value $U_{ch1}$ is then compared to the measured voltage value $U_{Ch0}$ stored in the controller's memory and determines the voltage increment $U_{ch1}-U_{ch0}$ (S6). If the difference of $U_{ch1}-U_{ch0}$ exceeds the pre-assigned value $\Delta U_{set}$, the charging process continues, and the newly measured value $U_{ch1}$ is stored in the memory of the voltage controller 6. Thereafter, the operations designated herein as S3-S7 are repeated until the difference of $U_{ch1}-U_{ch0}$ becomes lower than the specified value $\Delta U_{set}$, at which time the voltage controller 6 turns the key 7 on, and the charging process is discontinued (S8).

In this particular example, the range of the recommended value $\Delta q_{set}$ was made on the basis of the test results of various electrochemical capacitors of different type. The long-term operation of heterogeneous capacitors in the cycle mode showed that the optimal mode of operation corresponds to a Coulomb capacity value of between about 0.93-0.98. This implies that the overcharge of such a capacitor, which is required for stable cycle operation, is between about 0.02-0.08 against the rated (technical data sheet) Coulomb capacity of a reference energy storage device $Q_s$. In order to provide for appropriate accuracy of control and to maintain a desired level of Coulomb capacity, the minimum and maximum portions of the electricity quantity is then selected to be at least, not less than three times lower than the optimal rate of overcharge (i.e., $\Delta q_{min} \approx 0.007\ Q_s$ and $\Delta q_{max}=0.03\ Q_s$).

The accuracy rating of the measuring equipment associated with the charging process control system also imposes some requirements on the procedure of $\Delta q$ value selection. For example, since the calculated voltage increment across the terminals of the HES module should exceed the absolute error of voltage measurement $\Delta U$ by not less than a factor of three, then:

$$\Delta q_{min} \geq 3C\Delta U = 3\kappa\, CU_{max}/100,$$

wherein C corresponds to the capacitance of the HES module and k represents the accuracy rating of the measuring device, assuming that $U_{max}$ is close to the upper limit of the range of the equipment measurements.

Consequently, the specified portion of the electricity quantity, after whose passing the voltage measurements are taken across the terminals of the HES module, is preferably selected to be in the range of:

$$\min\{0.007Q_s; 3\kappa\, CU_{max}/100\} < \Delta q_{set} < 0.03 Q_s \quad (2)$$

In this example, the value of the portion of the electricity quantity $\Delta q_{set}$, on the basis of expression (2), is set as 1000 C.

Charging is performed by a constant current whose value is in the range of allowable values. The charging process is complete when the specified value of the voltage increment is achieved.

An advantage of this exemplary method of charge may be demonstrated, for example, by charging of HES module to the pre-assigned voltage of 16.8 V, but along with an increase of the charge current to 80 A. In this case, the voltage across the terminals of the HES does not reach the specified value. Further, when charging is continued, there occurs a decrease in voltage and a considerable increase in temperature caused by overcharging.

EXAMPLE 2

Figure 6:
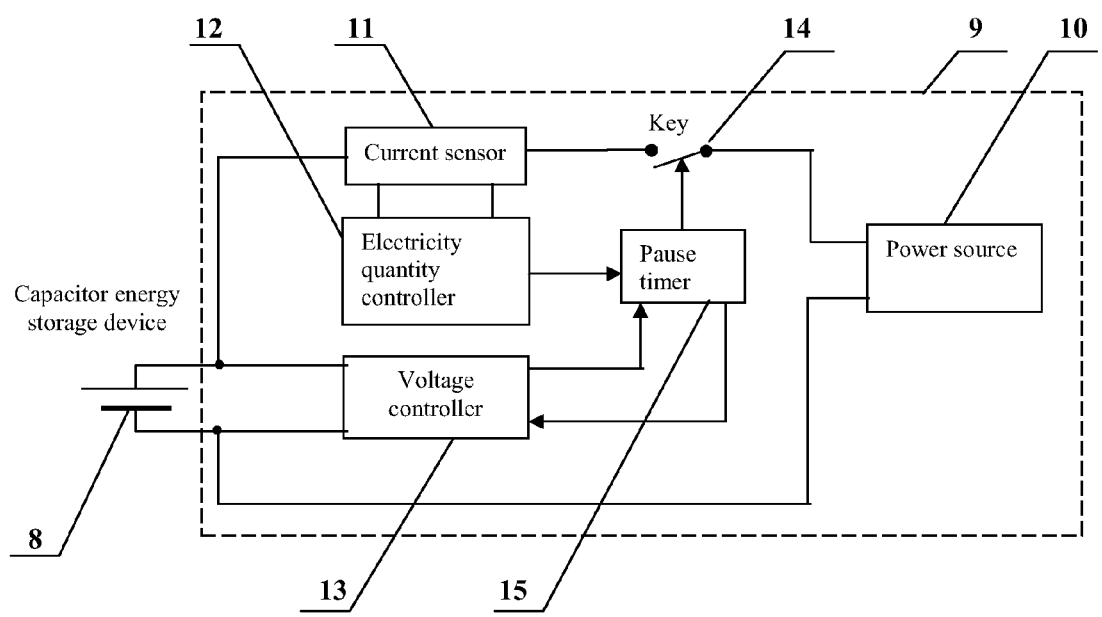
FIG. 6 is a block-diagram of another exemplary embodiment of a charger of the present invention.

Charging of the HES module, whose design is set forth in the description of Example 1, was performed. FIG. 6 shows a block-diagram of the charger 9 used to perform said charging. A HES module 8 is again connected to the charging device 9. As shown, the charging device 9 includes a power source 10, a current sensor 11, a controller of the electricity quantity 12, a voltage controller 13, a key 14, and a pause timer 15.

Figure 7:
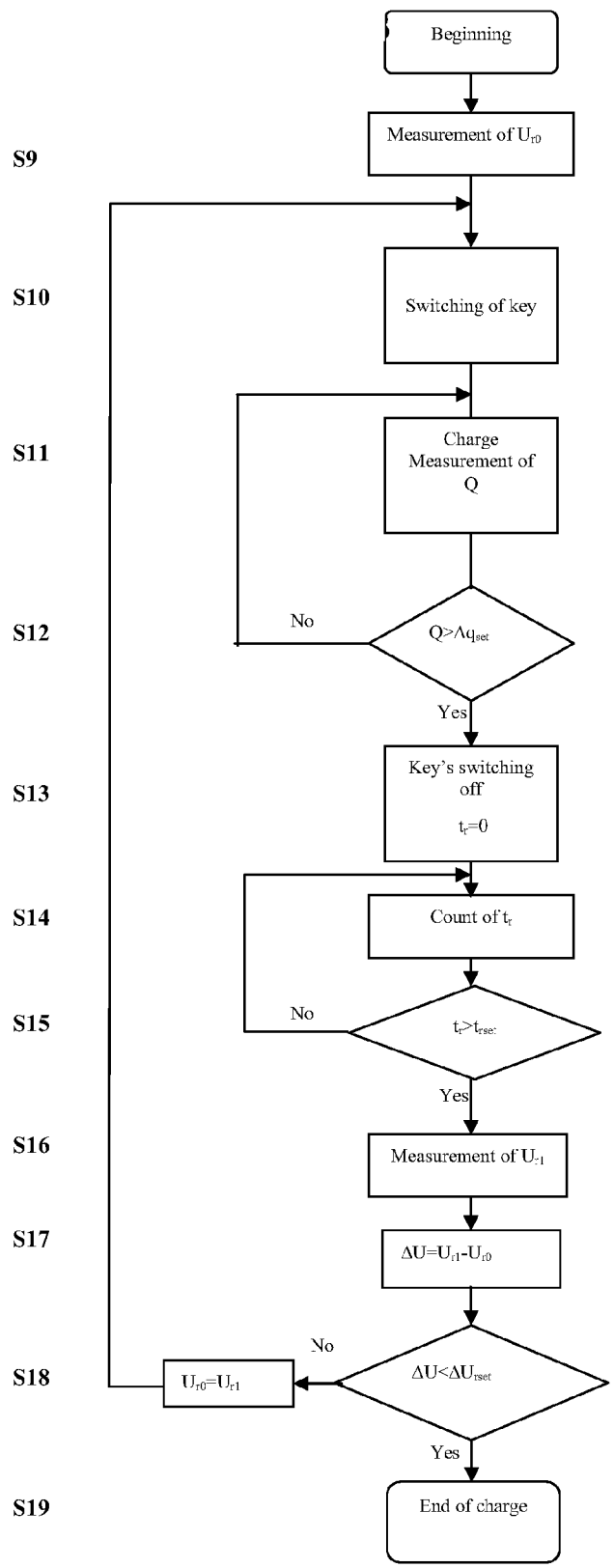
FIG. 7 diagrammatically represents the operating sequence of the charger of FIG. 6.

This particular charging process was performed in the sequence shown in FIG. 7. The charge power changed at random during the charging process. In this particular example, the pattern of charge power variation corresponds to the change of the output power of a wind generator during a windy day in the Central region of Russia.

At the time of switching, the charger 9 gives a signal to the pause timer 15, which in its turn gives a signal to the voltage controller 13 in order to measure the initial voltage $U_{r0}$ (S9). The voltage controller 13 measures the voltage across the terminals of the HES module and stores it in the memory. Upon completion of these operations, a signal is sent from the voltage controller 13 to the timer 15, which then gives signals to turn on the key 14 (S10) and to start the electricity quantity controller 12 (S11). If the electricity quantity does not exceed the specified portion of the electricity quantity $\Delta q_{set}$, charging continues (S12). When the specified value of the electricity quantity $\Delta q_{set}$ is achieved, the electricity quantity controller 12 resets the value of the electricity quantity to zero and gives a signal to the timer 15 which turns the key 14 off (S13) and starts the count of the duration of the rest period $t_r$ (S14). If the duration of the rest period does not reach the specified value, the count of time continues. When the duration of the rest period reaches the specified value $t_{rset}$, the timer 15 gives a signal to the voltage controller 13 (S15). The voltage controller 13 then measures the voltage $U_{r1}$ across the terminals of the HES module (S16), determines the voltage increment $\Delta U = U_{r1} - U_{r0}$ (S17), and compares the measured value of the voltage increment $\Delta U$ with the value $\Delta U_{set}$, which is stored in the controller's memory. If the value of the voltage increment $\Delta U$ exceeds the specified value $\Delta U_{set}$, the newly measured value $U_{r1}$ is stored in the memory of the controller 13, and the controller 13 sends the timer 15 a signal to continue the charging process (S18). The timer 15 again turns on the key 14 (S10) and the electricity quantity controller 12 (S11), and the steps designated above as S12-S17 are repeated. Alternatively, if the value of the voltage increment $\Delta U$ is lower than $\Delta U_{set}$, the voltage controller 13 turns the timer 15 on and the charge process is discontinued (S19).

Figure 8:
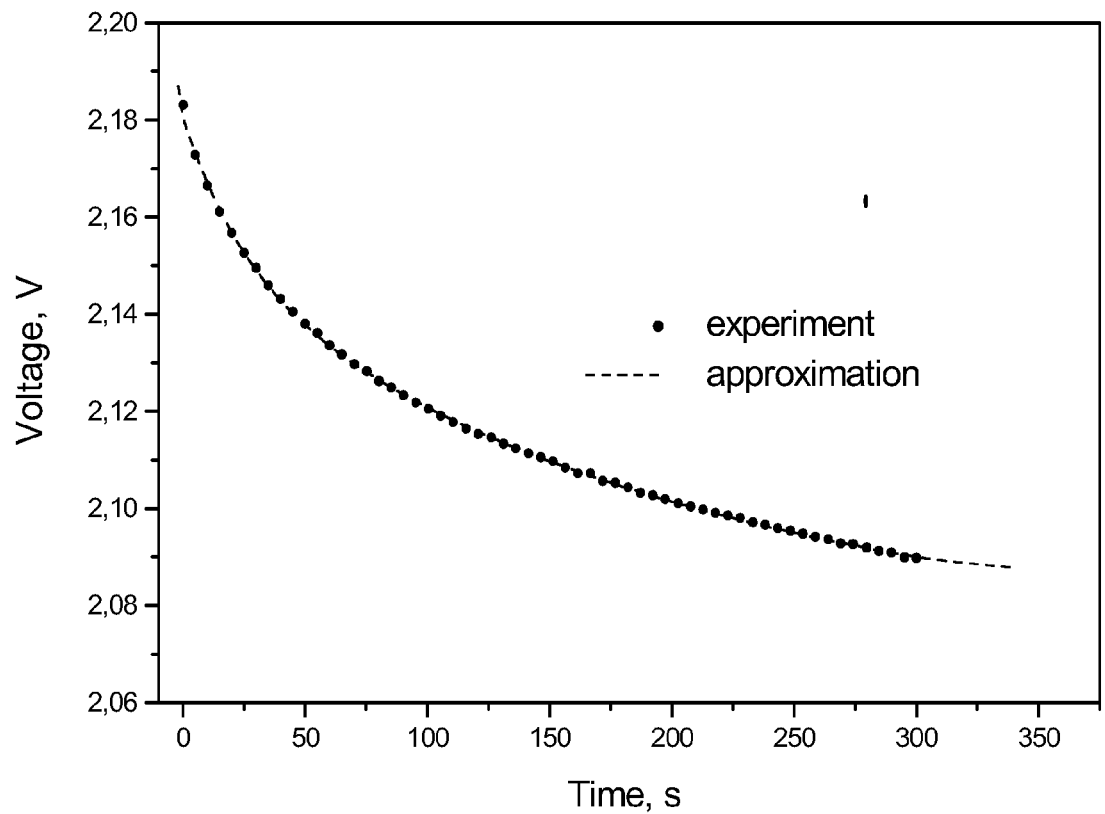
FIG. 8 graphically represents the change in voltage across the terminals of a HES-based capacitor module after interruption of the charging process.

In this particular exemplary embodiment, the duration of the rest periods $t_{rset}$ was selected on the basis of measurements of the rate of electrode depolarization. FIG. 8 shows the change of voltage in a single capacitor, which was preliminarily charged by constant current to a voltage of 2.4 V after which the charging current was turned off. The experimental curve showing the change in voltage across the terminals of the capacitor is approximated by the following exponential function of the second order $$U = U_0 + 2.9 \cdot 10^{-2} \cdot e^{-t/tr1} + 4 \cdot 10^{-4} e^{-t/tr2} \qquad (3)$$

where $t_{r1}$ and $t_{r2}$ are constants of the depolarization process.

The value of $U_0 = 2.07$ V determines the stationary voltage that is set upon completion of the depolarization process of the charged capacitor. The values $t_{r1}$ and $t_{r2}$ change in the same range of values subject to the state of charge of the capacitor. The measurements show that, at different temperatures of the capacitor, rates of charge and state of charge, the value $t_{r1}$ does not exceed 25, and $t_{r2}$ 200 seconds. The time $t_r$ for measurements of the voltage across the terminals of the capacitor during a rest period was selected from the interval $t_{r1} < t_{rset} < t_{r2}$. In this particular example, the value $t_{rset}$ during charging of the capacitor was set as 25 seconds. This implies that the contribution of the fast depolarization processes to the reduction of the voltage during a rest period decreased by e times and, upon expiration of this time, the voltage change in the capacitor is mostly determined by slow depolarization.

Figure 9:
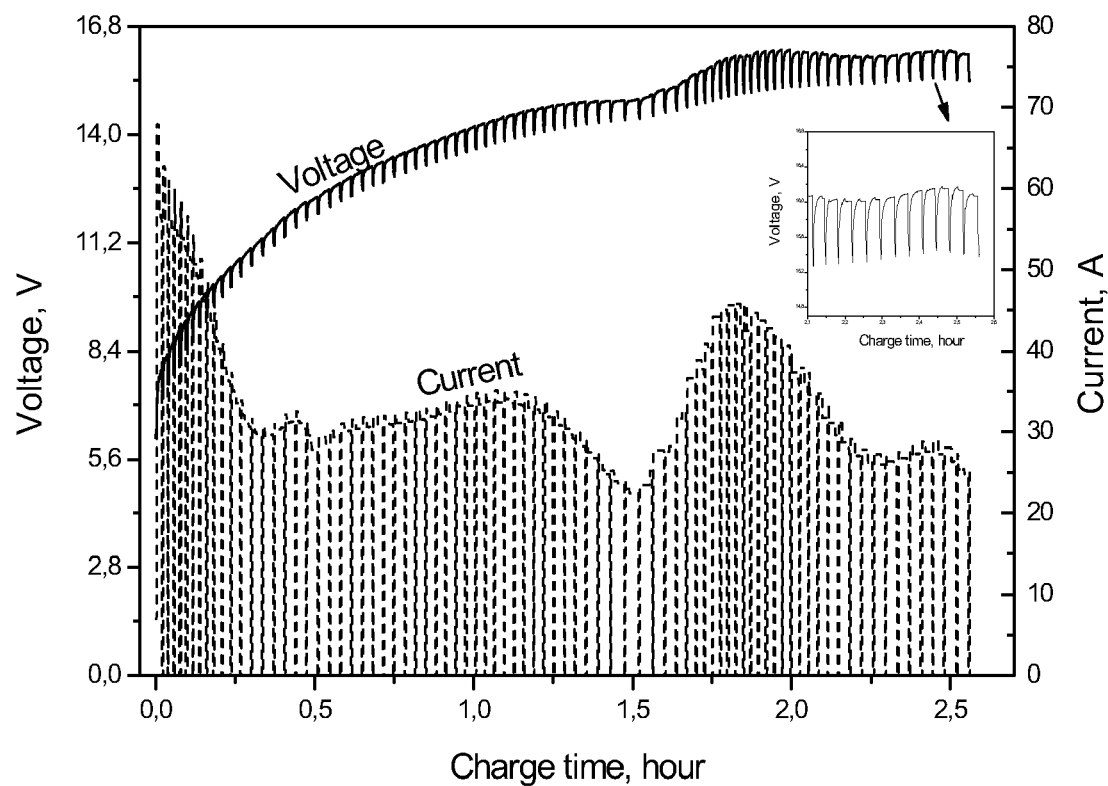
FIG. 9 graphically represents the change in voltage across the terminals of a HES-based capacitor module during charging under variable power.

The change in the current and voltage in response to charging of the HES module under variable power is graphically shown in FIG. 9. It is clear from FIG. 9 that several local maximum values of voltage are achieved when charging the HES module under variable power, which local maximum values do not correspond to the optimal state of charge. In the vicinity of these local maximum values, the voltage increment changes in terms of both value and sign.

In this particular example, charge interruption was performed after the passing of the specified electricity quantity $\Delta q_{set} = 1000$ C. The optimal state of charge in this temperature condition of the module is achieved if the specified value $\Delta U_{set} = 0$. The charge of the HES module was complete when the voltage increment $\Delta U_r$ in the rest periods reached the pre-assigned value $\Delta U_{r,set}$.

EXAMPLE 3

A capacitor energy storage device based on three modules connected in parallel was charged. Each module was based on 100 serially connected HES' of a $N_rOOH|KOH|C$ system. The parameters of a single capacitor at room temperature and charged by constant current in the voltage window of 1.7-0.8 V were observed to be:

| | |
|---|---|
| capacitance of the capacitor | 100 kF |
| Coulomb capacity | 25 ± 1 Ah |
| delivered energy | 30 ± 1 Wh |
| internal resistance | 0.5 mOhm |

The charging device used in this particular example was the charging device 9 shown in FIG. 6 and described above. The power source 10 comprised: a transformer having 3-phase power supplied thereto from a 380 V industrial grid, with the consumed power at a rated charge current of not more than 100 kW; a rectifier assembly; and a pulse-phase control device. The relative error of the current stabilization was ±3%. The maximum value of the constant current was 450 A. The maximum constant voltage output was 220 V.

Digital indicators within a data entry panel were arranged in a control panel. The values of the pre-assigned parameters were entered from the keyboard of the control panel. These pre-assigned parameters included values for charge current value, portion of electricity quantity $\Delta q_{set}$, $\Delta U_{rset1}$, and duration of rest periods $t_{r1}$, $t_{r2}$.

Figure 10:
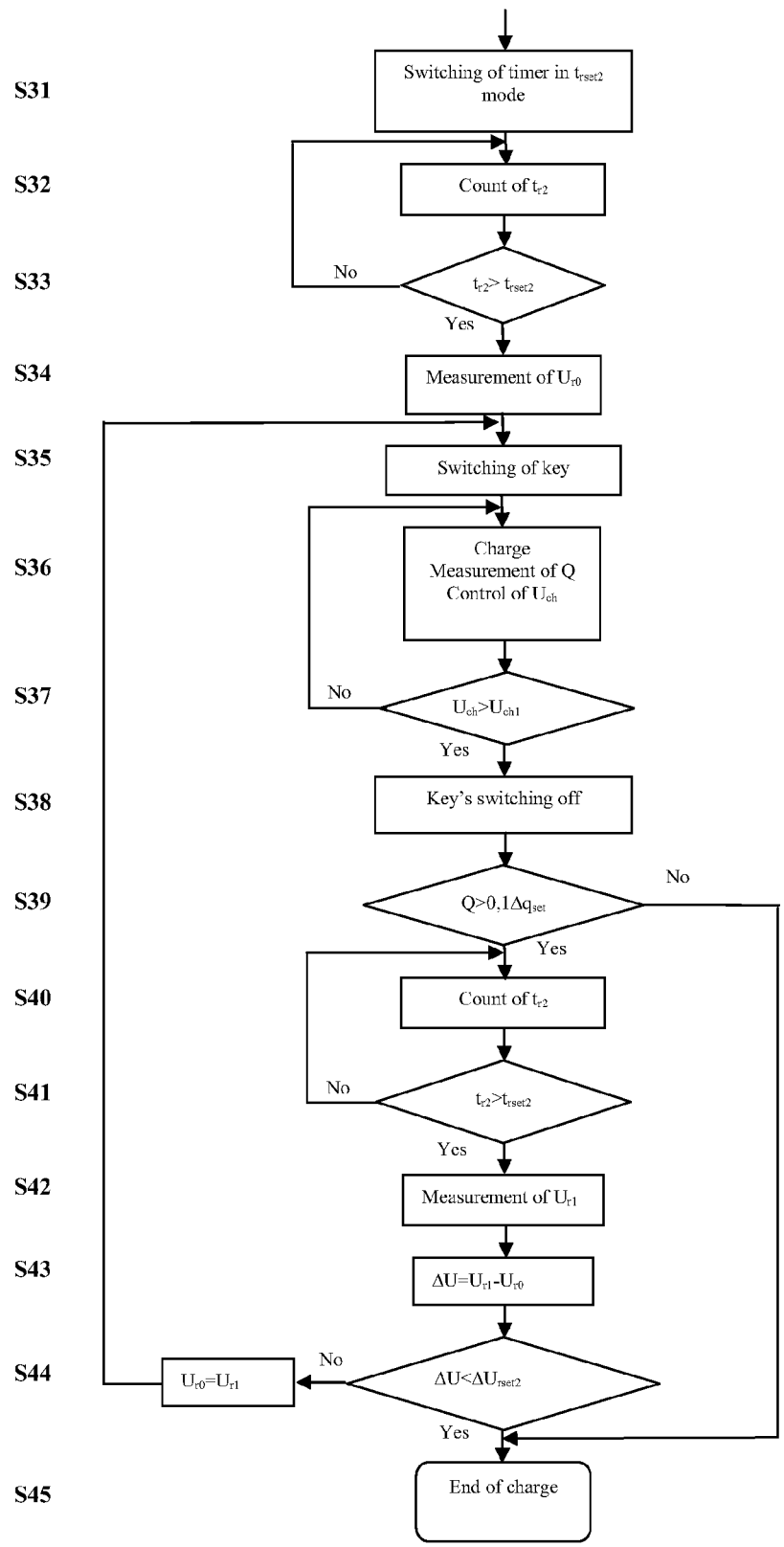
FIG. 10 is an operations sequence for yet another charging operation embodiment.
Figure 11:
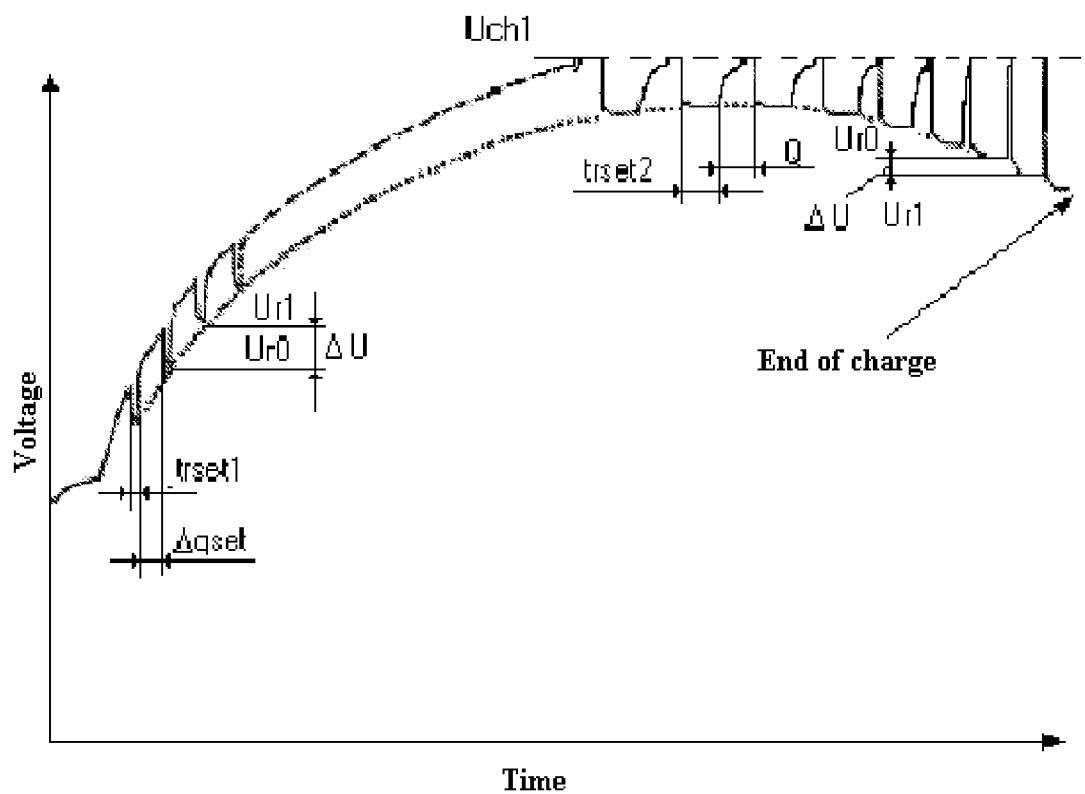
FIG. 11 graphically represents the change in voltage across the terminals of a HES-based capacitor module during charging with a voltage limitation during charging periods.

The timer 15 of the charging device 9 provided signals to control the key 14 and the voltage controller 13, to maintain the required duration of charge and pause periods. The key 14 provides for interruption of the charge process in response to signals from the controllers 12, 13 and the timer 15. Charging of the capacitor was performed in the sequence shown in FIG. 10. The change in the voltage across the terminals of the module is graphically illustrated in FIG. 11.

At the time of switching, the charging device 9 provides a signal to the timer 15 which, in turn, provides a signal to the voltage controller 13 in order to measure the initial voltage $U_{r0}$. The voltage controller 13 then measures the voltage across the terminals module and stores it in the memory (S20). Upon completion of these operations, a signal from the voltage controller is sent to the timer 15 which, in turn, operates to turn on the key (S21) and to start the electricity quantity controller 12 (S22). If the electricity quantity does not exceed the specified portion of electricity quantity $\Delta q_{set}$, the charge is continued (S23). When the specified electricity quantity $\Delta q_{set}$ is reached, the electricity quantity controller 12 resets the value of the electricity quantity to zero and gives a signal to the timer 15, which starts the voltage controller 13. The controller 13 measures and stores in memory the voltage $U_{ch1}$ across the terminals of the module 8 if the current is available in the charge circuit (S24), and thereafter turns off the key 14 (S25) and starts the count of the rest period $t_{r1}$ (S26). If the duration of the rest period does not reach the specified value, the rest period continues (S27). When the duration of the rest period reaches the assigned value $t_{rset1}$, the timer 15 signals the voltage controller 13. The voltage controller 13 then measures the voltage $U_{r1}$ across the terminals of the module 8 (S28), determines the voltage increment $\Delta U = \Delta U_{r1} - U_{r0}$ (S29) and compares the measured value with the value $\Delta U_{r,set1}$, which is stored in the memory of the controller 13. If the value of $\Delta U$ exceeds the specified value $\Delta U_{r,set1}$, the newly measured value $U_{r1}$ is stored in the memory of the controller 13, and the controller gives a signal to the timer 15 to continue the charging process (S30). In the case of a continued charging process, the timer again switches the key 14 to on (S21) and starts the electricity quantity controller 12 (S22), whereafter the steps designated above as S23-S29 are repeated.

Alternatively, if the difference $U_{r1} - U_{r0}$ (i.e., the voltage increment $\Delta U$) is lower than $\Delta U_{set1}$, the timer 15 signals the voltage controller 13, and the timer 15 increases the duration of the rest period (S31) to $t_{rset2}$ (S32-S33). At the end of the rest period, the voltage controller 13 measures and memorizes the voltage $U_{r0}$ in the energy storage device 8 (S34). Thereafter, the key 14 is turned on (S35), the measurement of the electricity quantity starts (S36), and the voltage controller 13 is switched over to a mode of continuous voltage measurement. When, during the charging process, the voltage across the terminals of the module 8 reaches the value $U_{ch1}$, the voltage controller 13 signals the timer 15 to turn off the key 14 (S38) and also signals the electricity quantity controller 12 (S39).

If the measured electricity quantity Q between the pauses is lower than $0.1\Delta q_{set}$, charging is stopped (S45). When $Q > 0.1 \Delta q_{set}$, the timer 15 counts the pause to the duration of $t_{rset2}$ (S40-S41). At the end of the pause $t_{rset2}$ the timer 15 signals the voltage controller 13. The voltage controller 13 then measures the voltage $U_{r1}$ across the terminals of the module 8 (S42) and compares the measured value with the value $U_{r0}$ (S43), which is stored in the memory of the controller 13.

If the difference $U_{r1} - U_{r0}$ exceeds the specified value $\Delta U_{set2}$, the newly measured value $U_{r0} = U_{r1}$ is stored in the memory of the controller 13, and the controller 13 signals the timer 15 (S44) to continue the charging process. The timer 15 turns on the key 14 (S35) and the electricity quantity controller 12 (S36) as described above. Alternatively, if the difference $U_{r1} - U_{r0} < \Delta U_{set2}$, the charging process is discontinued (S45).

Before charging was performed according to this exemplary embodiment, the following data was entered in the microcontroller's display:

| | |
|---|---|
| charge current | 360 A |
| portion of electricity quantity $\Delta q_{set}$ during the charge periods | 3600 C |
| value of voltage increment $\Delta U_{rset1}$ | +200 mV |
| duration of rest periods during the charge until the specified voltage increment is reached $t_{rset1}$ | 1 sec |
| duration of rest periods during the charge with the limitation of voltage in charge periods $t_{rset2}$ | 5 sec |
| criteria of the charge's completion | 10-fold reduction of electricity quantity portions in the charge periods |

The capacitor module, which was in different initial states of charge, was then charged. The duration of the charging process (according to the afore-mentioned algorithm) required to fully charge the module was 924 seconds. The value of the charge energy was 13.1 kWh. During charging of the module by a 90 A current, the value of the discharge energy was approximately 9.3 kWh.

The duration of the charge process of the partially discharged module was 186 seconds, and the value of the charge energy was approximately 2.3 kWh. When the module was discharged by a 90 A constant current, the value of the discharge energy was about 9.6 kWh. The heating of the capacitors at an 18° C. ambient temperature did not exceed 10° C.

Therefore, it will be understood by one skilled in the art that the preceding charge process allowed for the automatic completion of the charging process without preliminarily setting the end-point voltage of the charge, even though charging was performed at different initial levels of the state of charge.

EXAMPLE 4

A capacitor energy storage device was operated as a back-up power source. The energy storage device comprised a capacitor module having ten serially connected HES'. The design and parameters of a single capacitor of the module are described in Example 3, above. Over the course of time, there was a gradual reduction in the voltage across terminals of the module. In order to compensate for these energy losses, additional charging of the module was recurrently performed, which recharging was initiated when the pre-assigned value of the allowable minimum voltage was reached.

A block-diagram of the charging device 9 used to perform said recharging is shown in FIG. 6. The voltage controller 13 of the charging device 9 took continuous measurements of the voltage of the module. When the voltage was reduced to the specified value, the voltage controller signalled the timer 15 to turn on the charging device 9. Thereafter, charging was performed in the sequence shown in FIG. 7.

Before charging was performed, the following data was entered into an associated microcontroller:

| | |
|---|---|
| minimum voltage $U_{min}$, upon reaching of which, an automatic additional charge of the module was performed | 17 V |
| electricity quantity portion $\Delta q_{set}$ during the charge periods | 1000 C |
| value of voltage increment $\Delta U_{rset}$ | 0 mV |
| duration of rest periods during the charge until the specified voltage increment is reached | 1 sec |

Charging of the module was complete when the voltage increment $\Delta U_r$ during the rest periods reached the pre-assigned value $\Delta U_{rset} = 0$. The duration of additional one-time charge was about 4-7 minutes.

Figure 12:
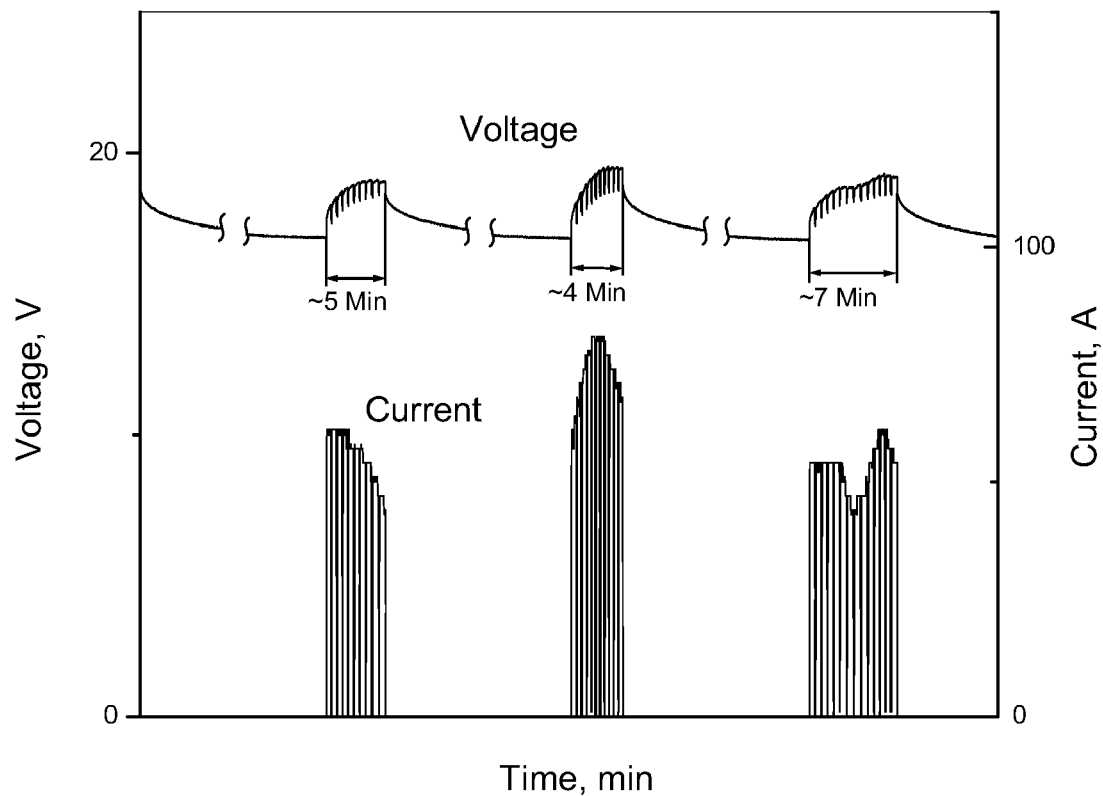
FIG. 12. graphically represents the change in voltage across the terminals of a HES-based capacitor module when charging is recurrently turned on to compensate for energy losses thereof.

FIG. 12 shows the change in the voltage across the terminals of the module during recharging by a power source with variable charging power.

This example illustrates the possibility of maintaining a capacitor device in a charged state by means of additional recurrent charges. The additional charge(s) may be performed irrespective of the initial state of charge, without controlling the temperature condition of the capacitor device, and with an unstable constant current source.

While certain embodiments of the present invention are described in detail above, the scope of the invention is not to be considered limited by such disclosure, and modifications are possible without departing from the spirit of the invention as evidenced by the following claims:

What is claimed is:

1. A method of charging an electrochemical capacitor, comprising:
    connecting said electrochemical capacitor to a constant current electrical energy source;
    charging said electrochemical capacitor with electrical energy from said constant current electrical energy source;
    measuring the voltage of said electrochemical capacitor;
    comparing the measured voltage with a predetermined voltage value(s);
    based on a comparison of measured voltages, either further charging said electrochemical capacitor or terminating said charging process;
    wherein the passing of specified portions of said charging electrical energy by said electrochemical capacitor during charging is controlled;
    after a specified portion of charging electrical energy is passed by said electrochemical capacitor, recurrently turning off said constant current electrical energy source so as to produce alternating charging and rest periods, each having some duration;
    measuring the voltage of said electrochemical capacitor at the end of each rest period;
    comparing the measured voltage at the end of each rest period with the measured voltage obtained at the preceding rest period;
    using said comparison of voltage measurements to determine a voltage increment; and
    terminating said charging process when said voltage increment reaches some predetermined value.

2. The method of claim 1, wherein said electrochemical capacitor is a heterogeneous electrochemical supercapacitor.

3. The method of claim 1, wherein the specified portions of charging electrical energy passed by said electrochemical capacitor are determined on the basis of the values of capacitance of said electrochemical capacitor and a threshold sensitivity of an associated recording system.

4. The method of claim 1, wherein, after passing a specified portion of the charging electrical energy by said electrochemical capacitor, the voltage across the terminals of said electrochemical capacitor is measured and a voltage increment is determined.

5. The method of claim 4, wherein the charging process is considered complete when the voltage increment reaches the predetermined voltage value.

6. The method of claim 1, wherein the charging process is performed regardless of the initial values of the state of charge and/or operating temperature of said electrochemical capacitor.

7. A method of charging an electrochemical capacitor, comprising:
    connecting said electrochemical capacitor to an electrical energy source;
    charging said electrochemical capacitor with electrical energy from said electrical energy source;
    after a specified portion of charging electrical energy is passed by said electrochemical capacitor, recurrently turning off said electrical energy source so as to produce alternating charging and rest periods, each having some duration;
    measuring the voltage of said electrochemical capacitor at the end of each rest period;
    comparing the measured voltage at the end of each rest period with the measured voltage obtained at the preceding rest period;
    using said comparison of voltage measurements to determine a voltage increment; and
    terminating said charging process based on the value of said voltage increment;
    wherein the passing of specified portions of said charging electrical energy by said electrochemical capacitor during charging is controlled.

8. The method of claim 7, wherein said electrical energy source is a constant current electrical energy source.

9. The method of claim 7, wherein all said rest periods are set to a constant duration.

10. The method of claim 7, further comprising measuring the voltage of said electrochemical capacitor at the end of each charging period.

11. The method of claim 7, wherein the duration of said rest periods is set to be equal to the time during which the contribution of fast processes of depolarization to a reduction in voltage of said electrochemical capacitor decreases by some specified factor.

12. The method of claim 7, wherein the duration of said rest periods is set to be equal to the time required to reduce the voltage of said electrochemical capacitor during the rest periods by some specified factor.

13. The method of claim 7, wherein the current value of said electrical energy source may change at random within an allowable range of current values.

14. The method of claim 7, wherein as soon as said voltage increment reaches a predetermined value, charging is continued with a voltage limitation during the charge period that is substantially equal to the value of voltage at the end of the preceding charge period.

15. The method of claim 7, wherein the charging process is performed regardless of the initial values of the state of charge and/or operating temperature of said electrochemical capacitor.

16. The method of claim 7, further comprising recurrent recharging of said electrochemical capacitor at specified time intervals in order to compensate for self-discharge energy losses thereof.

17. The method of claim 7, wherein the charging process is terminated when said voltage increment reaches some predetermined value.

18. A method of charging an electrochemical capacitor, comprising:
    connecting said electrochemical capacitor to an electrical energy source having a randomly changing current value;
    charging said electrochemical capacitor with electrical energy from said electrical energy source;
    after a specified portion of charging electrical energy has been passed by said electrochemical capacitor, recurrently turning off said electrical energy source so as to produce alternating periods of charging and rest, each having some duration;
    measuring the voltage of said electrochemical capacitor at the end of each period of rest;
    comparing the measured voltage at the end of each period of rest with the measured voltage obtained at the preceding period of rest;
    using said comparison of voltage measurements to determine a voltage increment; and
    terminating said charging process based on the value of said voltage increment;

wherein the passing of specified portions of said charging electrical energy by said electrochemical capacitor during charging is controlled.

19. The method of claim 18, wherein all said rest periods are set to a constant duration.

20. The method of claim 18, wherein as soon as said rest period voltage increment reaches a predetermined value, charging is continued with a voltage limitation during the charge period that is substantially equal to the value of voltage at the end of the preceding charging period.

21. The method of claim 20, wherein the charging process is terminated when the quantity of electrical energy provided to said electrochemical capacitor during said charging periods decreases by some specified factor.

22. The method of claim 20, wherein the charging process is terminated when the duration of said charging periods decreases by some specified factor.

23. The method of claim 18, further comprising recurrent recharging of said electrochemical capacitor at specified time intervals in order to compensate for self-discharge energy losses thereof.

* * * * *